(12) United States Patent
Knight et al.

(10) Patent No.: US 10,252,705 B2
(45) Date of Patent: Apr. 9, 2019

(54) SYSTEM FOR CONTROLLING A WHEEL BRAKE OF AN AIRCRAFT

(71) Applicant: Gulfstream Aerospace Corporation, Savannah, GA (US)

(72) Inventors: Michael Knight, Savannah, GA (US); Timothy Burns, Savannah, GA (US)

(73) Assignee: Gulfstream Aerospace Corporation, Savannah, GA (US)

( * ) Notice: Subject to any disclaimer, the term of this patent is extended or adjusted under 35 U.S.C. 154(b) by 0 days.

(21) Appl. No.: 15/419,845

(22) Filed: Jan. 30, 2017

(65) Prior Publication Data

US 2018/0215356 A1    Aug. 2, 2018

(51) Int. Cl.

| | |
|---|---|
| *B60T 8/17* | (2006.01) |
| *B60T 8/32* | (2006.01) |
| *B60T 8/1761* | (2006.01) |
| *B60T 8/34* | (2006.01) |
| *B60T 8/50* | (2006.01) |
| *B64C 25/46* | (2006.01) |

(52) U.S. Cl.
CPC .......... *B60T 8/1703* (2013.01); *B60T 8/1761* (2013.01); *B60T 8/325* (2013.01); *B60T 8/341* (2013.01); *B60T 8/50* (2013.01); *B64C 25/46* (2013.01)

(58) Field of Classification Search
CPC .. B60T 8/1703; B60T 8/1761; B60T 8/17616; B60T 8/341; B60T 8/38; B60T 8/50; B60T 8/5075; B60T 8/5081; B60T 8/5087; B60T 8/5093
USPC ................................................. 303/126, 157
See application file for complete search history.

(56) References Cited

U.S. PATENT DOCUMENTS

| | | | | |
|---|---|---|---|---|
| 5,927,821 A | * | 7/1999 | Bauer | B60R 21/013 180/271 |
| 6,604,708 B1 | | 8/2003 | DeVlieg | |
| 6,672,682 B2 | * | 1/2004 | Ewing | B60T 7/065 180/275 |

(Continued)

FOREIGN PATENT DOCUMENTS

| | | |
|---|---|---|
| DE | 3306368 A1 | 9/1983 |
| GB | 2116271 B * | 10/1985 |

OTHER PUBLICATIONS

German Patent and Trademark Office, Search Report for Application No. 102018101901.7 dated Oct. 15, 2018.

*Primary Examiner* — Thomas J Williams
(74) *Attorney, Agent, or Firm* — LKGlobal | Lorenz & Kopf, LLP

(57) ABSTRACT

A system is provided having a normal operational mode and a modulated operational mode. The system includes an input device configured to generate a command signal. The system further includes a brake controller configured to generate a brake actuation signal in response to the command signal. The system further includes a fluid source configured to provide fluid in response to the brake actuation signal. The fluid has a first portion and a second portion. The system further includes a return valve in fluid communication with the fluid source, and configured to return the first portion of the fluid to the fluid source when the system is in the modulated operational mode. The system further includes a wheel brake in fluid communication with the fluid source and configured to engage a wheel of the aircraft in response to at least the second portion of the fluid.

18 Claims, 3 Drawing Sheets

(56) References Cited

U.S. PATENT DOCUMENTS

| | | | |
|---|---|---|---|
| 6,866,348 B2 * | 3/2005 | Ewel | B60T 8/4225 303/113.1 |
| 2010/0102173 A1 | 4/2010 | Everett et al. | |
| 2011/0226569 A1 | 9/2011 | Devlieg | |

* cited by examiner

SYSTEM FOR CONTROLLING A WHEEL BRAKE OF AN AIRCRAFT

TECHNICAL FIELD

The present invention generally relates to vehicles and more particularly relates to aircraft braking systems.

BACKGROUND

As aircraft weights and speeds have increased, the brake energy required to stop these aircraft has also increased. To account for these increases, modern aircraft include large and robust wheel brakes designed to be prepared for worst case conditions including an ability to apply the maximum brake pressure needed to bring the aircraft to the shortest possible stop after a high speed rejected take-off or accounting for a partial failure of one or more of the wheel brakes. While these wheel brakes are effective in worst case conditions, precise control of the wheel brakes while the aircraft is on the ground at low speeds (e.g., taxi and parking speeds) is difficult.

As one example, hydraulic wheel brake systems include a brake control valve for controlling the amount of pressure provided to the wheel brakes in response to a brake command provided by a pilot. Under normal deceleration conditions during landing of the aircraft, pressure control by the brake control valve is generally linear relative to the brake command provided by the pilot. In contrast, pressure control by the brake control valve is generally non-linear relative to the brake command provided by the pilot when the aircraft is at low speeds. In particular, because only a minimal amount of pressure is necessary to control the aircraft by the wheel brakes at low speeds, small changes in positioning of the brake control valve can result in large changes in the pressure provided to the wheel brakes. To this end, this generally non-linear relationship between the position of the brake control valve and the pressure provided to the wheel brakes can result in erratic braking of the aircraft by the pilot thereby diminishing passenger comfort within the aircraft.

Accordingly, it is desirable to provide an improved system for controlling a wheel brake. Furthermore, other desirable features and characteristics will become apparent from the subsequent summary and detailed description and the appended claims, taken in conjunction with the accompanying drawings and the foregoing technical field and background.

BRIEF SUMMARY

Various non-limiting embodiments of a system for controlling a wheel brake of an aircraft and various non-limiting embodiments of a method for the same, are disclosed herein.

In one non-limiting embodiment, the system has, but is not limited to, a normal operational mode and a modulated operational mode. The system includes, but is not limited to, an input device configured to generate a command signal defining a first brake force. The system further includes, but is not limited to, a brake controller configured to generate a brake actuation signal in response to the command signal. The brake actuation signal defines a second brake force when the system is in the normal operational mode and defines a third brake force when the system is in the modulated operational mode. The third brake force is greater than the second brake force. The system further includes, but is not limited to, a fluid source configured to provide fluid in response to the brake actuation signal. The fluid has a first portion and a second portion. The system further includes, but is not limited to, a return valve in fluid communication with the fluid source, and configured to return the first portion of the fluid to the fluid source when the system is in the modulated operational mode. The system further includes, but is not limited to, a wheel brake in fluid communication with the fluid source and configured to engage a wheel of the aircraft in response to at least the second portion of the fluid.

In another non-limiting embodiment, the method includes, but is not limited to, the step of generating a command signal defining a first brake force. The method further includes, but is not limited to, the step of generating a brake actuation signal in response to the command signal. The brake actuation signal defines a second brake force when the system is in a normal operational mode and defines a third brake force when the system is in a modulated operational mode. The third brake force is greater than the second brake force. The method includes, but is not limited to, the step of providing fluid in response to the brake actuation signal utilizing a fluid source. The fluid has a first portion and a second portion. The method includes, but is not limited to, the step of returning the first portion of the fluid to the fluid source when the system is in the modulated operational mode. The method includes, but is not limited to, the step of engaging a wheel of the aircraft in response to at least the second portion of the fluid utilizing a wheel brake.

BRIEF DESCRIPTION OF THE DRAWINGS

The present invention will hereinafter be described in conjunction with the following drawing figures, wherein like numerals denote like elements.

DETAILED DESCRIPTION

Figure 1:
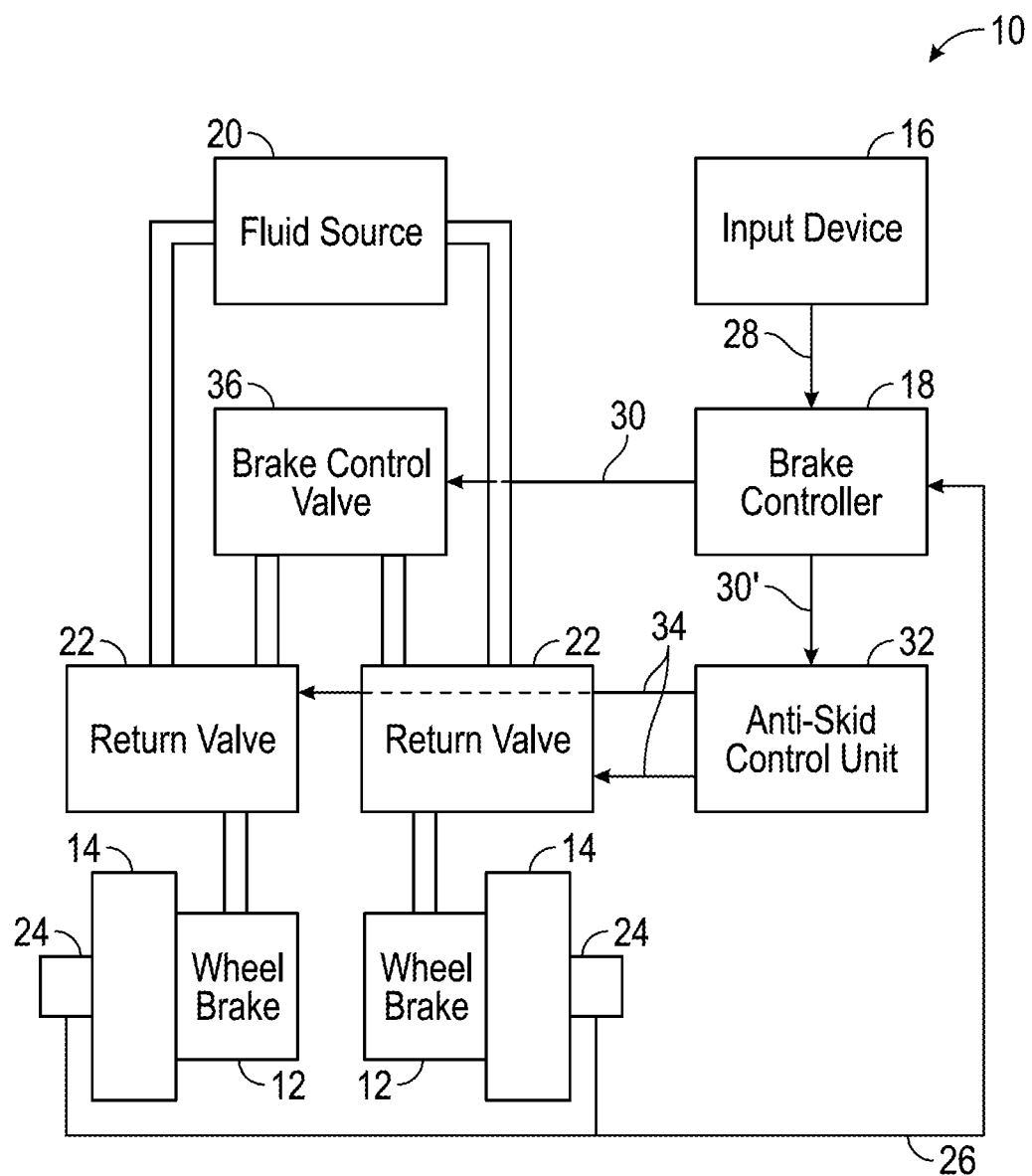
FIG. 1 is a schematic diagram illustrating a non-limiting embodiment of a system for controlling a wheel brake an aircraft.

The following detailed description is merely exemplary in nature and is not intended to limit the invention or the application and uses of the invention. Furthermore, there is no intention to be bound by any theory presented in the preceding background or the following detailed description. It should be understood that throughout the drawings, corresponding reference numerals indicate like or corresponding parts and features. As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

A system for controlling a wheel brake of an aircraft is provided herein. In an exemplary embodiment, the system has a normal operational mode and a modulated operational mode. The wheel brake may be configured to provide maximum braking performance when the system is in the normal operational mode. Such performance of the wheel brake is suitable during take-off and landing of the aircraft. The wheel brake may be configured to provide improved deceleration control at low speeds when the systems is in the modulated operational mode. Such deceleration control of the wheel brake is suitable during low speed travel of the aircraft on the ground, such as when the aircraft is taxiing or parking.

To achieve such deceleration control at low travel speeds, the system may include a brake control valve and a return valve with both valves in communication with the wheel brake. The brake control valve may actuate from a closed valve position to a fully open valve position with a plurality of positions therebetween. During initial actuation of the brake control valve from the closed valve position to a partially open position, fluid pressure is provided by the brake control valve in a non-linear manner. In other words, small changes in positioning of the brake control valve can result in large changes in the fluid pressure provided to the wheel brake. As the brake control valve continues to actuate from the partially open position to a nearly fully open position, the fluid pressure is provided by the brake control valve in a generally linear manner. When the system is in the modulated operational mode, the brake control valve may actuate between the partially open position and the nearly fully open position during low speed travel of the aircraft on the ground.

To counteract the increase in the amount of fluid pressure provided to the wheel brake when the system is in the modulated operational mode during low speed travel of the aircraft on the ground, a portion of the fluid provided to the wheel brake is returned to a fluid source by the return valve while another portion of the fluid actuates the wheel brake. Therefore, by actuating the brake control valve between the partially open position and the nearly fully open position where the fluid pressure is provided the wheel brake in the generally linear manner, and returning a portion of the fluid to the fluid source thereby reducing the fluid pressure that actuates the wheel brake, improved deceleration control at low speed travel of the aircraft can be achieved.

A greater understanding of the system described above may be obtained through a review of the illustrations accompanying this application together with a review of the detailed description that follows.

A system 10 for controlling a wheel brake 12 of an aircraft (not shown) is provided herein. The aircraft typically includes left and right wheels 14 with a wheel brake 12 coupled to each of the wheels 14. The system 10 has a normal operational mode and a modulated operational mode. In embodiments, the wheel brake 12 is configured to provide maximum braking performance when the systems 10 is in the normal operational mode. Such performance of the wheel brake 12 is suitable during take-off and landing of the aircraft. In embodiments, the wheel brake 12 is configured to provide improved deceleration control at low speeds when the systems 10 is in the modulated operational mode. Such deceleration control of the wheel brake 12 is suitable during low speed travel of the aircraft on the ground, such as when the aircraft is taxiing or parking.

FIG. 1 is a schematic diagram illustrating a non-limiting embodiment of the system 10. The system 10 includes an input device 16, a brake controller 18, a fluid source 20, a return valve 22, and the wheel brake 12. In embodiments, the system 10 further includes a wheel speed sensor 24 configured to detect a wheel speed of the wheel 14. The system 10 may include a wheel speed sensor 24 coupled to each of the wheels 14. The wheel speed sensor 24 may be configured to generate a wheel speed signal 26 in response to rotation of the wheel 14. The wheel speed signal 26 may define the wheel speed of the wheel 14. The system 10 may be in the normal operational mode when the wheel speed of the wheel 14 is above a predetermined wheel speed threshold, and the system 10 is in the modulated operational mode when the wheel speed of the wheel 14 is at or below the predetermined wheel speed threshold. The predetermined wheel speed threshold may be in an amount of from 0 to 30, alternatively from 0 to 20, alternatively from 0 to 10 or alternatively from 0.1 to 10, miles per hour (mph), or in an amount of no greater than 30, alternatively no greater than 20 or alternatively no greater than 10, mph. In embodiments, the system 10 is in the normal operational mode when the wheel speed is constant over a predetermined time period, and the system 10 is in the modulated operational mode when the wheel speed is decreasing over a predetermined time period. The predetermined time period may be in an amount of from 1 to 10,000, alternatively from 1 to 5,000, alternatively from 1 to 1,000, alternatively from 1,000 to 10,000, alternatively from 1,000 to 5,000 or alternatively from 5,000 to 10,000, milliseconds (ms), or in an amount of no greater than 10,000, alternatively no greater than 5,000 or alternatively no greater than 1,000, ms.

The input device 16 is configured to generate a brake command signal 28 defining a first brake force. The input device 16 may be automated or may be require operator input. In embodiments, the input device 16 requires operator input and is further defined as a brake pedal. However, it is to be appreciated that any type of input device may be utilized to generate a brake command signal 28. In embodiments when the input device 16 is a brake pedal, the brake pedal may generate the command signal in response to actuation of the brake pedal by an operator of the aircraft. Typically, the aircraft includes a brake pedal for each of the wheel brakes 12. The brake pedal may be configured to actuate between a resting position to a full actuation position with a plurality of positions therebetween.

The first brake force may be a numeric range extending from 0 to 100 with 0 representing no force and 100 representing the maximum amount of force capable of being applied by the system 10. It is to be appreciated that the numeric range for the first brake force is only exemplary and thus may extend between any set of numerical values. For example, in embodiments, if the input device 16 is at the resting position, the corresponding first brake force may be 0, if the input device 16 is actuated to a middle position, the corresponding first brake force may be between 0 and 100, and if the input device 16 is actuated to the full actuation position, the corresponding first brake force may be 100. In certain embodiments, the first brake force corresponds to a pressure in an amount of from 100 to 3000 pounds per square inch (psi). In embodiments, the system 10 is in the normal operation mode when the first brake force is above a predetermined brake force threshold, and the system 10 is in the modulated operational mode when the first brake force is at or below a predetermined force threshold. The predetermined brake force threshold may be in an amount of from 10 to 500, alternatively from 100 to 500, alternatively from 200 to 400 or alternatively from 250 to 350, psi, or in an amount of no greater than 500, alternatively no greater than 400 or alternatively no greater than 350, psi. In certain embodiments, the predetermined brake force threshold is 300 psi.

The brake controller 18 is configured to generate a brake actuation signal 30 in response to the brake command signal 28. In embodiments, the brake controller 18 is further configured to be communicatively coupled to input device 16. The brake actuation signal 30 defines a second brake force when the system 10 is in the normal operational mode and defines a third brake force when the system 10 is in the modulated operational mode. The third brake force is greater than the second brake force. In embodiments, the third brake force is greater than the second brake force in an amount of from 5 to 85, alternatively 10 to 85, alternatively 10 to 50 or alternatively 10 to 20%. In certain embodiments, the third brake force is greater than the second brake force in an amount of 15%. To render the third brake force greater than the second brake force in response to the same brake command signal, a third brake force factor may be applied to the brake command signal 28 to define the third bake force. It is to be appreciated that a second brake force factor may be applied to the brake command signal 28 to define the second brake force so long as the third brake force factor is greater than the second brake force factor.

The second brake force may be a numeric range extending from 0 to 100 with 0 representing no force and 100 representing the maximum amount of force capable of being applied by the system 10. It is to be appreciated that the numeric range for the second brake force is only exemplary and thus may extend between any set of numerical values. For example, in embodiments, if the brake command signal 28 defines a first brake force in an amount of 20, the corresponding second brake force may be 20. However, it is to be appreciated that the second brake force factor may be applied to brake command signal 28 thereby rendering the second brake force to be less than or greater than 20. In certain embodiments, the second brake force corresponds to a pressure in an amount of from 100 to 3000, alternatively 100 to 2000, alternatively 100 to 1000 or alternatively 100 to 250, psi.

The third brake force may be a numeric range extending from 0 to 100 with 0 representing no force and 100 representing the maximum amount of force capable of being applied by the system 10. It is to be appreciated that the numeric range for the third brake force is only exemplary and thus may extend between any set of numerical values. For example, in embodiments, if the brake command signal 28 defines a first brake force in an amount of 20, the corresponding third brake force may be 30 in view of the third brake force factor. In certain embodiments, the third brake force corresponds to a pressure in an amount of from 100 to 3000, alternatively 100 to 2000, alternatively 100 to 1000 or alternatively 500 to 1000, psi.

The fluid source 20 is configured to provide fluid in response to the brake actuation signal 30. In certain embodiments, the fluid source 20 is further configured to be communicatively coupled to brake controller 18. The fluid source 20 may be configured to provide fluid to at least the wheel brake 12. The fluid may be further defined as hydraulic fluid. However, it is to be appreciated that any form of fluid may be utilized, such as gaseous fluids. The fluid is typically provided to at least the wheel brake 12 under a pressure. In certain embodiments, when the system 10 is in the normal operational mode, the pressure of the fluid provided to at least the wheel brake 12 corresponds to the second brake force, and when the system 10 is in the modulated operational mode, the pressure of the fluid provided to at least the wheel brake 12 corresponds to the third brake force.

The fluid has a first portion and a second portion. When the system 10 is in the normal operational mode, both the first portion and the second portion of the fluid are provided to the wheel brake 12 with the combined amount of the fluid provided based on the second brake force. When the system 10 is in the modulated operational mode, the first portion of the fluid is returned to the fluid source 20 and the second portion of the fluid is provided to the wheel brake 12 with the combined amount of the fluid provided based on the third brake force. The first portion of the fluid returned to the fluid source 20 may be in an amount of from 1 to 80, alternatively from 5 to 60, alternatively 10 to 50, alternatively 20 to 40 or alternatively 25 to 35, wt. % based on a total weight of the fluid provided by the fluid source 20. In certain embodiments, first portion of the fluid returned to the fluid source 20 may be in an amount of 30 wt. % based on a total weight of the fluid provided by the fluid source 20.

The return valve 22 is in fluid communication with the fluid source 20. The system 10 may include a return valve 22 for each of the wheels 14. The return valve 22 is configured to return the first portion of the fluid to the fluid source 20 when the system 10 is in the modulated operational mode. In certain embodiments, the return valve 22 is further configured to be communicatively coupled to brake controller 18. In embodiments, the return valve 22 is in fluid communication between the wheel brake 12 and the fluid source 20. The return valve 22 may be configured to provide the first portion and the second portion of the fluid to the wheel brake 12 when the system 10 is in the normal operational mode. The return valve 22 may be configured to provide the second portion of the fluid to the wheel brake 12 and return the first portion of the fluid to the fluid source 20 when the system 10 is in the modulated operational mode.

In embodiments, the return valve 22 is further defined as an anti-skid valve. In these embodiments, the system 10 may further include an anti-skid valve control unit 32. The anti-skid valve control unit 32 may be communicatively coupled to brake controller 18 and the anti-skid valve. The anti-skid valve control unit 32 may generate a return signal 34 in response to a brake actuation signal 30', which may be generated by the brake controller 18, when the system 10 is in the modulated operational mode. It is to be appreciated that the brake actuation signals 30 and 30' may be the same or different. The anti-skid valve may be configured to return the first portion of the fluid to the fluid source 20 when the system 10 is in the modulated operational mode in response to the return signal 34. The anti-skid valve may be disabled when the system 10 is in the normal operational mode.

The wheel brake 12 is in fluid communication with the fluid source 20 and configured to engage the wheel 14 of the aircraft in response to at least the second portion of the fluid. The system 10 may include a wheel brake 12 for each of the wheels 14. In embodiments, the wheel brake 12 is configured to engage the wheel 14 in response to the first portion of fluid and the second portion of fluid when the system 10 is in the normal operational mode. In embodiments, the wheel brake 12 is configured to engage the wheel 14 in response to only the second portion of fluid when the system 10 is in the modulated operational mode.

In embodiments, the wheel brake 12 includes a rotor (not shown) coupled to the wheel 14 and an actuator (not shown) adjacent the rotor. The actuator may be configured to engage the rotor in response to at least the second portion of the fluid. The wheel brake 12 may be a disc brake. Examples of suitable disc brakes include single disc brakes, floating disc brakes, fixed disc brakes, dual disc brakes, multiple disc brakes, and segmented rotor-disc brakes. In certain embodiments, the wheel brake 12 is a segmented rotor-disc brake including multiple discs and stators.

In embodiments, the fluid source 20 includes a brake control valve 36. The brake control valve 36 may configured to provide fluid to at least the wheel brake 12 in response to the brake actuation signal 30. In embodiments, the brake control valve 36 is in fluid communication between the fluid source 20 and the return valve 22. In these embodiments, the brake control valve 36 is configured to provide fluid to at least the wheel brake 12 through the return valve 22 in response to the brake actuation signal 30. The brake control valve 36 may be further configured to be communicatively coupled to brake controller 18.

Figures 2A, 2B, 2C, 2D, 2E:
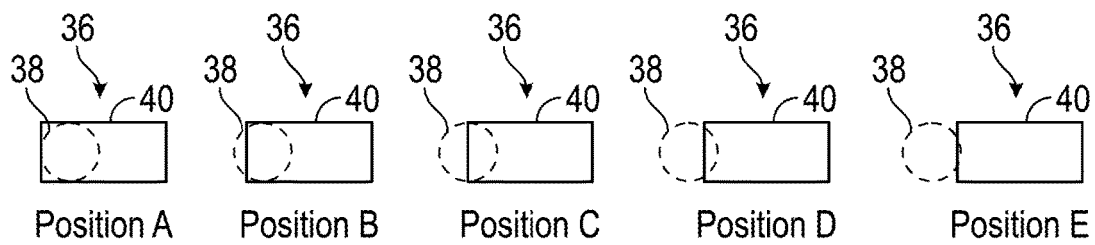
FIGS. 2A, 2B, 2C, 2D, and 2E are a series of plan views illustrating a non-limiting embodiment of the system of FIG. 1 including a brake control valve actuating between a closed valve position and a fully open valve position.

FIG. 2 is a series of plan views illustrating the system 10 including the brake control valve 36 actuating between a closed valve position and a fully open valve position. The brake control valve 36 may define an orifice 38 with the brake control valve 36 configured to meter the amount of fluid that is provided through the orifice 38 to at least the wheel brake 12 by the fluid source 20. In embodiments, the brake control valve 36 includes a gate 40 configured to cooperate with the orifice 38 to meter the amount of fluid that is provided to at least the wheel brake 12. In certain embodiments, the orifice 38 is generally circular. The gate 40 is configured to move proximate the orifice 38 between the closed valve position and the open valve position with a plurality of valve positions therebetween. As shown in FIGS. 2A-2E, the gate 40 is configured to move from the closed valve position (Position A), to a first open valve position (Position B), then to a second open valve position (Position C), then to a third open valve position (Position D), and then to a fully open valve position (Position E). As the gate 40 moves from the closed valve position to the fully open position, the pressure of the fluid provided through the orifice 38 to at least the wheel brake 12 may not correspond linearly to the position of the gate 40 along the orifice 38.

Figure 3:
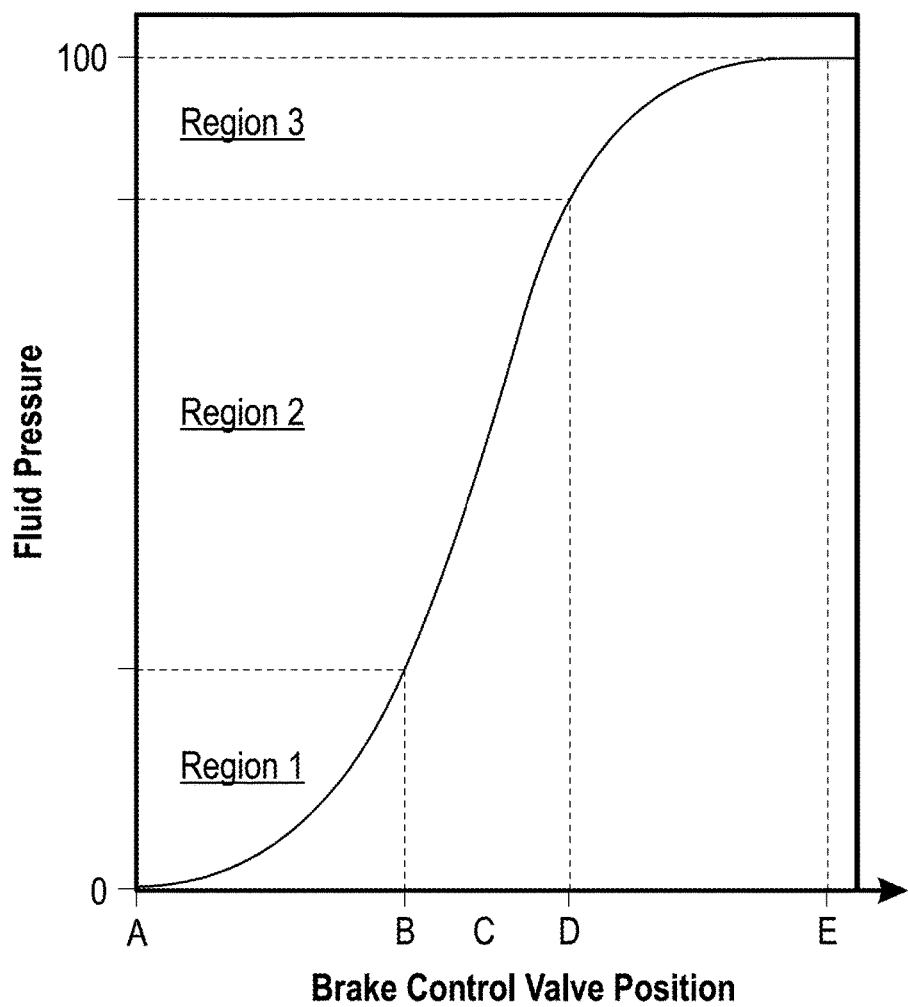
FIG. 3 is a chart illustrating a non-limiting relationship between an amount of fluid pressure provided and a position of the brake control valve of FIG. 2.

FIG. 3 is a chart illustrating a non-limiting relationship between an amount of fluid pressure provided to the wheel brake 12 and a position of the brake control valve 36 of FIG. 2. The chart includes a low pressure region (Region 1), a medium pressure region (Region 2), and a high pressure region (Region 3). In embodiments, Region 1 is associated with the brake control valve 36 moving from Position A to Position B. As the brake control valve 36 moves through Region 1, the amount of fluid pressure provided through the orifice 38 to at least the wheel brake 12 increases in a non-linear manner. In embodiments, Region 2 is associated with the brake control valve 36 moving from Position B through Position C and to Position D. As the brake control valve 36 moves through Region 2, the amount of fluid pressure provided through the orifice 38 to at least the wheel brake 12 increases in a generally linear manner. In embodiments, Region 3 is associated with the brake control valve 36 moving from Position D to Position E. As the brake control valve 36 moves through Region 3, the amount of fluid pressure provided through the orifice 38 to at least the wheel brake 12 again increases in a non-linear manner.

In certain embodiments, the fluid pressure increasing and decreasing in a generally linear manner is advantageous for providing improved deceleration control. To this end, when the system 10 is in the normal operational mode, the brake control valve 36 moves from Position B through Position C and to Position D to provide fluid pressure (Region 2) to at least the wheelbrake 12 during normal deceleration of the aircraft during landing. Likewise, when the system 10 is in the modulated operational mode, the brake control valve 36 moves from Position B through Position C and to Position D to provide fluid pressure (Region 2) to at least the wheel brake 12 during taxiing and parking of the aircraft. As such, the system 10 can achieve improved deceleration control of the aircraft at low speeds, such as during taxiing and parking of the aircraft, by adjusting the fluid pressure to increase and decrease within Region 2.

In embodiments, to counteract the increase in the amount of fluid pressure provided to the wheel brake 12 when the system 10 is in the modulated operational mode during taxiing and parking of the aircraft, the first portion of the fluid provided to at least the wheel brake 12 is returned to the fluid source 20 by the return valve 22 while the second portion of the fluid actuates the wheel brake 12 to engage the wheel 14. Therefore, by actuating the brake control valve 36 in Region 2 where the fluid pressure is provided to at least the wheel brake 12 in the generally linear manner, and returning the first portion of the fluid to the fluid source 20 thereby reducing the fluid pressure that actuates the wheel brake 12, improved deceleration control at low speed travel of the aircraft can be achieved.

Figure 4:
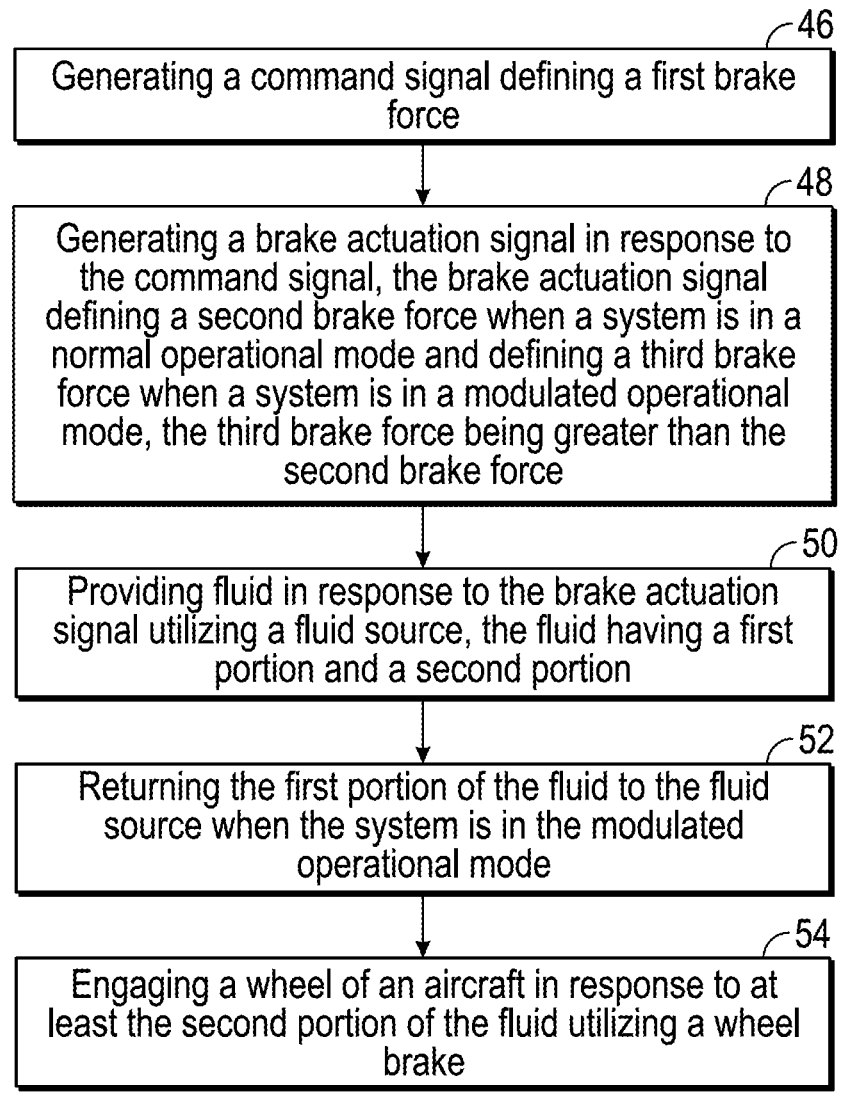
FIG. 4 is a flow diagram illustrating a non-limiting embodiment of a method for controlling a wheel brake an aircraft utilizing the system of FIG. 1.

FIG. 4 is a flow diagram illustrating a non-limiting embodiment of a method for controlling the wheel brake 12 of the aircraft utilizing the system 10. The method includes the step 46 of generating the command signal defining the first brake force. The method further includes the step 48 of generating the brake actuation signal in response to the command signal. As described above, the brake actuation signal defines the second brake force when the system 10 is in the normal operational mode and defines the third brake force when the system 10 is in the modulated operational mode. As also described above, the third brake force is greater than the second brake force. The method further includes the step 50 of providing fluid in response to the brake actuation signal utilizing the fluid source 20. As also described above, the fluid has the first portion and the second portion. The method further includes the step 52 of returning the first portion of the fluid to the fluid source 20 when the system 10 is in the modulated operational mode. The method further includes the step 54 of engaging the wheel 14 of the aircraft in response to at least the second portion of the fluid utilizing the wheel brake 12.

In embodiments, the method further includes the step of detecting the wheel speed of the wheel 14 utilizing the wheel speed sensor 24. In embodiments, the method further includes the steps of activating the normal operational mode when the wheel speed is above the predetermined wheel speed threshold, and activating the modulated operational mode when the wheel speed is at or below the predetermined wheel speed threshold. In embodiments, the method further includes the steps of activating the normal operational mode when the wheel speed is constant over the predetermined time period, and activating the modulated operational mode when the wheel speed is decreasing over the predetermined time period. In embodiments, the method further includes the step of activating the normal operational mode when the first brake force is above the predetermined brake force threshold, and activating the modulated operational mode when the first brake force is at or below the predetermined brake force threshold.

While at least one exemplary embodiment has been presented in the foregoing detailed description of the disclosure, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the disclosure as set forth in the appended claims.

What is claimed is:

1. A system for controlling a wheel brake of an aircraft, the system having a normal operational mode and a modulated operational mode, the system comprising:
   an input device configured to generate a command signal defining a first brake force;
   a brake controller configured to generate a brake actuation signal in response to the command signal, the brake actuation signal defining a second brake force when the system is in the normal operational mode and defining a third brake force when the system is in the modulated operational mode, the third brake force being greater than the second brake force;
   a fluid source configured to provide fluid in response to the brake actuation signal, the fluid having a first portion and a second portion;
   a return valve in fluid communication with the fluid source, and configured to return the first portion of the fluid to the fluid source when the system is in the modulated operational mode;
   a wheel brake in fluid communication with the fluid source and configured to engage a wheel of the aircraft in response to at least the second portion of the fluid; and
   a wheel speed sensor configured to detect a wheel speed of the wheel;
   wherein the system is in the modulated operational mode when the wheel speed is decreasing over a predetermined time period.

2. The system of claim 1, wherein the wheel brake is configured to engage the wheel in response to the first portion of fluid and the second portion of fluid when the system is in the normal operational mode and wherein the wheel brake is configured to engage the wheel in response to only the second portion of fluid when the system is in the modulated operational mode.

3. The system of claim 1, wherein the system is in the normal operational mode when the wheel speed is above a predetermined wheel speed threshold, and the system is in the modulated operational mode when the wheel speed is at or below the predetermined wheel speed threshold.

4. The system of claim 3, wherein the predetermined wheel speed threshold is in an amount of from 0 to 30 miles per hour.

5. The system of claim 1, wherein the system is in the normal operational mode when the wheel speed is constant over a predetermined time period.

6. The system of claim 1, wherein the return valve is in fluid communication between the wheel brake and the fluid source.

7. The system of claim 6, wherein the return valve is further configured to provide the second portion of the fluid to the wheel brake when the system is in the modulated operational mode.

8. The system of claim 7, wherein the return valve is configured to provide the first portion and the second portion of the fluid to the wheel brake when the system is in the normal operational mode.

9. The system of claim 1, wherein the return valve is further defined as an anti-skid valve.

10. The system of claim 1 further comprising an anti-skid valve control unit, wherein the anti-skid valve control unit is configured to generate a return signal in response to the brake actuation signal when the system is in the modulated operational mode.

11. The system of claim 1, wherein the fluid source comprises a brake control valve, and the brake control valve is configured provide fluid in response to the brake actuation signal.

12. The system of claim 1, wherein the fluid is further defined as hydraulic fluid.

13. The system of claim 1, wherein the system is in the modulated operational mode when the first brake force is at or below a predetermined brake force threshold.

14. A method for controlling a wheel brake of an aircraft utilizing a system, the system having a normal operational mode and a modulated operational mode, said method comprising the steps of:
   generating a command signal defining a first brake force;
   generating a brake actuation signal in response to the command signal, the brake actuation signal defining a second brake force when the system is in the normal operational mode and defining a third brake force when the system is in the modulated operational mode, the third brake force being greater than the second brake force;
   providing fluid in response to the brake actuation signal utilizing a fluid source, the fluid having a first portion and a second portion;
   returning the first portion of the fluid to the fluid source when the system is in the modulated operational mode;
   engaging a wheel of the aircraft in response to at least the second portion of the fluid utilizing a wheel brake;
   activating the normal operational mode when the first brake force is above a predetermined brake force threshold; and
   activating the modulated operational mode when the first brake force is at or below the predetermined brake force threshold.

15. The method of claim 14 further comprising the step of detecting a wheel speed of the wheel utilizing a wheel speed sensor.

16. The method of claim 15, further comprising the steps of:
   activating the normal operational mode when the wheel speed is above a predetermined wheel speed threshold; and
   activating the modulated operational mode when the wheel speed is at or below the predetermined wheel speed threshold.

17. The method of claim 15, further comprising the steps of:
   activating the normal operational mode when the wheel speed is constant over a predetermined time period; and
   activating the modulated operational mode when the wheel speed is decreasing over the predetermined time period.

18. A system for controlling a wheel brake of an aircraft, the system having a normal operational mode and a modulated operational mode, the system comprising:
   an input device configured to generate a command signal defining a first brake force;
   a brake controller configured to generate a brake actuation signal in response to the command signal, the brake actuation signal defining a second brake force when the system is in the normal operational mode and defining a third brake force when the system is in the modulated operational mode, the third brake force being greater than the second brake force;

a fluid source configured to provide fluid in response to the brake actuation signal, the fluid having a first portion and a second portion;

a return valve in fluid communication with the fluid source, and configured to return the first portion of the fluid to the fluid source when the system is in the modulated operational mode;

a wheel brake in fluid communication with the fluid source and configured to engage a wheel of the aircraft in response to at least the second portion of the fluid; and wherein the system is in the normal operational mode when the first brake force is above a predetermined brake force threshold, and the system is in the modulated operational mode when the first brake force is at or below the predetermined brake force threshold.

* * * * *